United States Patent
Arduini et al.

(10) Patent No.: US 10,763,749 B2
(45) Date of Patent: Sep. 1, 2020

(54) MULTI-RESONANT CONVERTER POWER SUPPLY

(71) Applicant: CISCO TECHNOLOGY, INC., San Jose, CA (US)

(72) Inventors: Douglas Paul Arduini, San Ramon, CA (US); Joel Richard Goergen, Soulsbyville, CA (US); Sung Kee Baek, San Ramon, CA (US)

(73) Assignee: CISCO TECHNOLOGY, INC, San Jose, CA (US)

( * ) Notice: Subject to any disclaimer, the term of this patent is extended or adjusted under 35 U.S.C. 154(b) by 0 days.

(21) Appl. No.: 16/191,308

(22) Filed: Nov. 14, 2018

(65) Prior Publication Data

US 2020/0153337 A1    May 14, 2020

(51) Int. Cl.
  *H02M 1/42*    (2007.01)
  *H02M 3/158*    (2006.01)

(52) U.S. Cl.
  CPC ....... *H02M 3/1582* (2013.01); *H02M 1/4225* (2013.01); *H02M 1/4241* (2013.01)

(58) Field of Classification Search
  CPC .. H02M 1/4225; H02M 1/4241; H02M 3/155; H02M 3/157; H02M 3/158; H02M 3/1582; H02M 3/1584; H02M 3/1588
  USPC ........................................ 327/103, 541, 543
  See application file for complete search history.

(56) References Cited

U.S. PATENT DOCUMENTS

| | | | |
|---|---|---|---|
| 3,335,324 A | 8/1967 | Buckeridge | |
| 4,811,187 A | 3/1989 | Nakajima et al. | |
| 5,652,893 A | 7/1997 | Ben-Meir | |
| 6,008,631 A * | 12/1999 | Johari | H02M 3/158 |
| | | | 323/222 |
| 6,220,955 B1 | 4/2001 | Posa | |
| 6,259,745 B1 | 7/2001 | Chan | |
| 6,636,538 B1 | 10/2003 | Stephens | |
| 6,685,364 B1 | 2/2004 | Brezina | |
| 6,784,790 B1 | 8/2004 | Lester | |
| 6,826,368 B1 | 11/2004 | Koren | |
| 6,855,881 B2 | 2/2005 | Khoshnood | |
| 6,860,004 B2 | 3/2005 | Hirano | |
| 7,325,150 B2 | 1/2008 | Lehr | |
| 7,420,355 B2 | 9/2008 | Liu | |
| 7,490,996 B2 | 2/2009 | Sommer | |
| 7,492,059 B2 | 2/2009 | Peker | |

(Continued)

FOREIGN PATENT DOCUMENTS

| CN | 1209880 C | 7/2005 |
|---|---|---|
| CN | 201689347 U | 12/2010 |

(Continued)

OTHER PUBLICATIONS https://www.fischerconnectors.com/us/en/products/fiberoptic.

(Continued)

*Primary Examiner* — William Hernandez

(74) *Attorney, Agent, or Firm* — Cindy Kaplan

(57) ABSTRACT

In one embodiment, an apparatus includes a first stage comprising a first active switch, a first resonant inductor, and a resonant capacitor and a second stage comprising a second active switch, a second resonant inductor, and a filter capacitor. The first and second stages form a non-isolated multi-resonant converter for converting a DC input voltage to a DC output voltage.

20 Claims, 12 Drawing Sheets

(56) References Cited

U.S. PATENT DOCUMENTS

| | | |
|---|---|---|
| 7,509,505 B2 | 3/2009 | Randall |
| 7,583,703 B2 | 9/2009 | Bowser |
| 7,589,435 B2 | 9/2009 | Metsker |
| 7,593,747 B1 | 9/2009 | Karam |
| 7,603,570 B2 | 10/2009 | Schindler |
| 7,616,465 B1 | 11/2009 | Vinciarelli |
| 7,813,646 B2 | 10/2010 | Furey |
| 7,835,389 B2 | 11/2010 | Yu |
| 7,854,634 B2 | 12/2010 | Filipon |
| 7,881,072 B2 | 2/2011 | DiBene |
| 7,915,761 B1 | 3/2011 | Jones |
| 7,921,307 B2 | 4/2011 | Karam |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,037,324 B2 | 10/2011 | Hussain |
| 8,081,589 B1 | 12/2011 | Gilbrech |
| 8,184,525 B2 | 5/2012 | Karam |
| 8,276,397 B1 | 10/2012 | Carlson |
| 8,279,883 B2 | 10/2012 | Diab |
| 8,310,089 B2 | 11/2012 | Schindler |
| 8,319,627 B2 | 11/2012 | Chan |
| 8,345,439 B1 | 1/2013 | Goergen |
| 8,350,538 B2 | 1/2013 | Cuk |
| 8,358,893 B1 | 1/2013 | Sanderson |
| 8,700,923 B2 | 4/2014 | Fung |
| 8,712,324 B2 | 4/2014 | Corbridge |
| 8,750,710 B1 | 6/2014 | Hirt |
| 8,781,637 B2 | 7/2014 | Eaves |
| 8,787,775 B2 | 7/2014 | Earnshaw |
| 8,829,917 B1 | 9/2014 | Lo |
| 8,836,228 B2 | 9/2014 | Xu et al. |
| 8,842,430 B2 | 9/2014 | Hellriegel |
| 8,849,471 B2 | 9/2014 | Daniel |
| 8,966,747 B2 | 3/2015 | Vinciarelli |
| 9,019,895 B2 | 4/2015 | Li |
| 9,024,473 B2 | 5/2015 | Huff |
| 9,184,795 B2 | 11/2015 | Eaves |
| 9,189,036 B2 | 11/2015 | Ghoshal |
| 9,189,043 B2 | 11/2015 | Vorenkamp |
| 9,273,906 B2 | 3/2016 | Goth |
| 9,319,101 B2 | 4/2016 | Lontka |
| 9,321,362 B2 | 4/2016 | Woo |
| 9,373,963 B2 | 6/2016 | Kuznelsov |
| 9,419,436 B2 | 8/2016 | Eaves |
| 9,510,479 B2 | 11/2016 | Vos |
| 9,531,551 B2 | 12/2016 | Balasubramanian |
| 9,590,811 B2 | 3/2017 | Hunter, Jr. |
| 9,618,714 B2 | 4/2017 | Murray |
| 9,640,998 B2 | 5/2017 | Dawson |
| 9,665,148 B2 | 5/2017 | Hamdi |
| 9,693,244 B2 | 6/2017 | Maruhashi |
| 9,734,940 B1 | 8/2017 | McNutt |
| 9,853,689 B2 | 12/2017 | Eaves |
| 9,874,930 B2 | 1/2018 | Vavilala |
| 9,882,656 B2 | 1/2018 | Sipes, Jr. |
| 9,893,521 B2 | 2/2018 | Lowe |
| 9,948,198 B2 | 4/2018 | Imai |
| 9,985,600 B2 | 5/2018 | Xu |
| 10,007,628 B2 | 6/2018 | Pitigoi-Aron |
| 10,028,417 B2 | 7/2018 | Schmidtke |
| 10,128,764 B1 | 11/2018 | Vinciarelli |
| 10,248,178 B2 | 4/2019 | Brooks |
| 10,407,995 B2 | 9/2019 | Moeny |
| 10,439,432 B2 | 10/2019 | Eckhardt |
| 2001/0024373 A1* | 9/2001 | Cuk ........... H02M 1/44 363/16 |
| 2002/0126967 A1 | 9/2002 | Panak |
| 2004/0000816 A1 | 1/2004 | Khoshnood |
| 2004/0033076 A1 | 2/2004 | Song |
| 2004/0043651 A1 | 3/2004 | Bain |
| 2004/0073703 A1 | 4/2004 | Boucher |
| 2004/0264214 A1 | 12/2004 | Xu |
| 2005/0197018 A1 | 9/2005 | Lord |
| 2005/0268120 A1 | 12/2005 | Schindler |
| 2006/0202109 A1 | 9/2006 | Delcher |
| 2006/0209875 A1 | 9/2006 | Lum |
| 2007/0103168 A1 | 5/2007 | Batten |
| 2007/0236853 A1 | 10/2007 | Crawley |
| 2007/0263675 A1 | 11/2007 | Lum |
| 2007/0284946 A1 | 12/2007 | Robbins |
| 2007/0288125 A1 | 12/2007 | Quaratiello |
| 2008/0198635 A1 | 8/2008 | Hussain |
| 2008/0229120 A1 | 9/2008 | Diab |
| 2008/0310067 A1 | 12/2008 | Diab |
| 2010/0077239 A1 | 3/2010 | Diab |
| 2010/0117808 A1 | 5/2010 | Karam |
| 2010/0171602 A1 | 7/2010 | Kabbara |
| 2010/0190384 A1 | 7/2010 | Lanni |
| 2010/0237846 A1 | 9/2010 | Vetteth |
| 2010/0290190 A1 | 11/2010 | Chester |
| 2011/0004773 A1 | 1/2011 | Hussain |
| 2011/0007664 A1 | 1/2011 | Diab |
| 2011/0290497 A1 | 1/2011 | Stenevik |
| 2011/0083824 A1 | 4/2011 | Rogers |
| 2011/0228578 A1* | 9/2011 | Serpa ........... H02M 3/158 363/132 |
| 2011/0266867 A1 | 11/2011 | Schindler |
| 2012/0064745 A1 | 3/2012 | Ottliczky |
| 2012/0170927 A1 | 7/2012 | Huang |
| 2012/0201089 A1 | 8/2012 | Barth |
| 2012/0231654 A1 | 9/2012 | Conrad |
| 2012/0317426 A1 | 12/2012 | Hunter, Jr. |
| 2012/0319468 A1 | 12/2012 | Schneider |
| 2013/0077923 A1 | 3/2013 | Weem |
| 2013/0079633 A1 | 3/2013 | Weem |
| 2013/0103220 A1 | 4/2013 | Eaves |
| 2013/0249292 A1 | 9/2013 | Blackwell, Jr. |
| 2013/0272721 A1 | 10/2013 | Van Veen |
| 2014/0111180 A1 | 4/2014 | Vladan |
| 2014/0129850 A1 | 5/2014 | Paul |
| 2014/0258742 A1 | 9/2014 | Chien |
| 2014/0265550 A1 | 9/2014 | Milligan |
| 2014/0372773 A1 | 12/2014 | Heath |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0215001 A1 | 7/2015 | Eaves |
| 2015/0215131 A1 | 7/2015 | Paul |
| 2015/0333918 A1 | 11/2015 | White, III |
| 2015/0340818 A1 | 11/2015 | Scherer |
| 2016/0020911 A1 | 1/2016 | Sipes, Jr. |
| 2016/0064938 A1 | 3/2016 | Balasubramanian |
| 2016/0111877 A1 | 4/2016 | Eaves |
| 2016/0118784 A1* | 4/2016 | Saxena ........... H02H 3/08 361/101 |
| 2016/0133355 A1 | 5/2016 | Glew |
| 2016/0134331 A1 | 5/2016 | Eaves |
| 2016/0142217 A1 | 5/2016 | Gardner |
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer |
| 2016/0273722 A1 | 9/2016 | Crenshaw |
| 2016/0294500 A1 | 10/2016 | Chawgo |
| 2016/0308683 A1 | 10/2016 | Pischl |
| 2016/0352535 A1 | 12/2016 | Hiscock |
| 2017/0041152 A1 | 2/2017 | Sheffield |
| 2017/0041153 A1 | 2/2017 | Picard |
| 2017/0054296 A1 | 2/2017 | Daniel |
| 2017/0110871 A1 | 4/2017 | Foster |
| 2017/0123466 A1 | 5/2017 | Carnevale |
| 2017/0146260 A1 | 5/2017 | Ribbich |
| 2017/0155517 A1 | 6/2017 | Cao |
| 2017/0164525 A1 | 6/2017 | Chapel |
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0244318 A1* | 8/2017 | Giuliano ........... H02M 3/07 |
| 2017/0248976 A1 | 8/2017 | Moller |
| 2017/0325320 A1 | 11/2017 | Wendt |
| 2018/0024964 A1 | 1/2018 | Mao |

(56) References Cited

U.S. PATENT DOCUMENTS

| | | | |
|---|---|---|---|
| 2018/0053313 | A1 | 2/2018 | Smith |
| 2018/0054083 | A1 | 2/2018 | Hick |
| 2018/0060269 | A1 | 3/2018 | Kessler |
| 2018/0088648 | A1 | 3/2018 | Otani |
| 2018/0098201 | A1 | 4/2018 | Torello |
| 2018/0102604 | A1 | 4/2018 | Keith |
| 2018/0123360 | A1 | 5/2018 | Eaves |
| 2018/0159430 | A1* | 6/2018 | Albert ............... H05B 45/37 |
| 2018/0188712 | A1 | 7/2018 | MacKay |
| 2018/0191513 | A1 | 7/2018 | Hess |
| 2018/0254624 | A1 | 9/2018 | Son |
| 2018/0313886 | A1 | 11/2018 | Mlyniec |
| 2019/0267804 | A1 | 8/2019 | Matan |
| 2019/0280895 | A1 | 9/2019 | Mather |

FOREIGN PATENT DOCUMENTS

| | | |
|---|---|---|
| CN | 204836199 U | 12/2015 |
| CN | 205544597 | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2693688 A1 | 2/2014 |
| WO | WO199316407 A1 | 8/1993 |
| WO | WO2010053542 | 5/2010 |
| WO | WO2017054030 | 4/2017 |
| WO | WO2017167926 A1 | 10/2017 |
| WO | WO2018017544 A1 | 1/2018 |
| WO | WO2019023731 A1 | 2/2019 |

OTHER PUBLICATIONS http://www.strantech.com/products/tfoca-genx-hybrid-2×2-fiber-optic-copper-connector/.

http://www.qpcfiber.com/product/connectors/e-link-hybrid-connector/.

https://www.lumentum.com/sites/default/files/technical-library-items/poweroverfiber-tn-pv-ae_0.pdf.

"Network Remote Power Using Packet Energy Transfer", Eaves et al., www.voltserver.com, Sep. 2012.

Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.

Implementation Guide, "Virtual Chassis Technology Best Practices", Juniper Networks, 8010018-009-EN, Jan 2016, https://wwwjuniper.net/us/en/local/pdf/implementation-guides/8010018-en.pdf, 29 pages.

Yencheck, Thermal Modeling of Portable Power Cables, 1993.

Zang, Machine Learning-Based Temperature Prediction for Runtime Thermal Management across System Components, Mar. 2016.

Data Center Power Equipment Thermal Guidelines and Best Practices.

Dynamic Thermal Rating of Substation Terminal Equipment by Rambabu Adapa, 2004.

Chen, Real-Time Termperature Estimation for Power MOSEFETs Conidering Thermal Aging Effects:, IEEE Trnasactions on Device and Materials Reliability, vol. 14, No. 1, Mar. 2014.

Jingquan Chen et al: "Buck-boost PWM converters having two independently controlled switches", 32nd Annual IEEE Power Electronics Specialists Conference. PESC 2001. Conference Proceedings, Vancouver, Canada, Jun. 17-21, 2001; [Annual Power Electronics Specialists Conference], New York, NY: IEEE, US, vol. 2, Jun. 17, 2001 (Jun. 17, 2001), pp. 736-741, XP010559317, DOI: 10.1109/PESC.2001.954206, ISBN 978-0-7803-7067-8 paragraph [SectionII]; figure 3.

Cheng K W E et al: "Constant Frequency, Two-Stage Quasiresonant Convertor", IEE Proceedings B. Electrical Power Applications, 1271980 1, vol. 139, No. 3, May 1, 1992 (May 1, 1992), pp. 227-237, XP000292493, the whole document.

\* cited by examiner

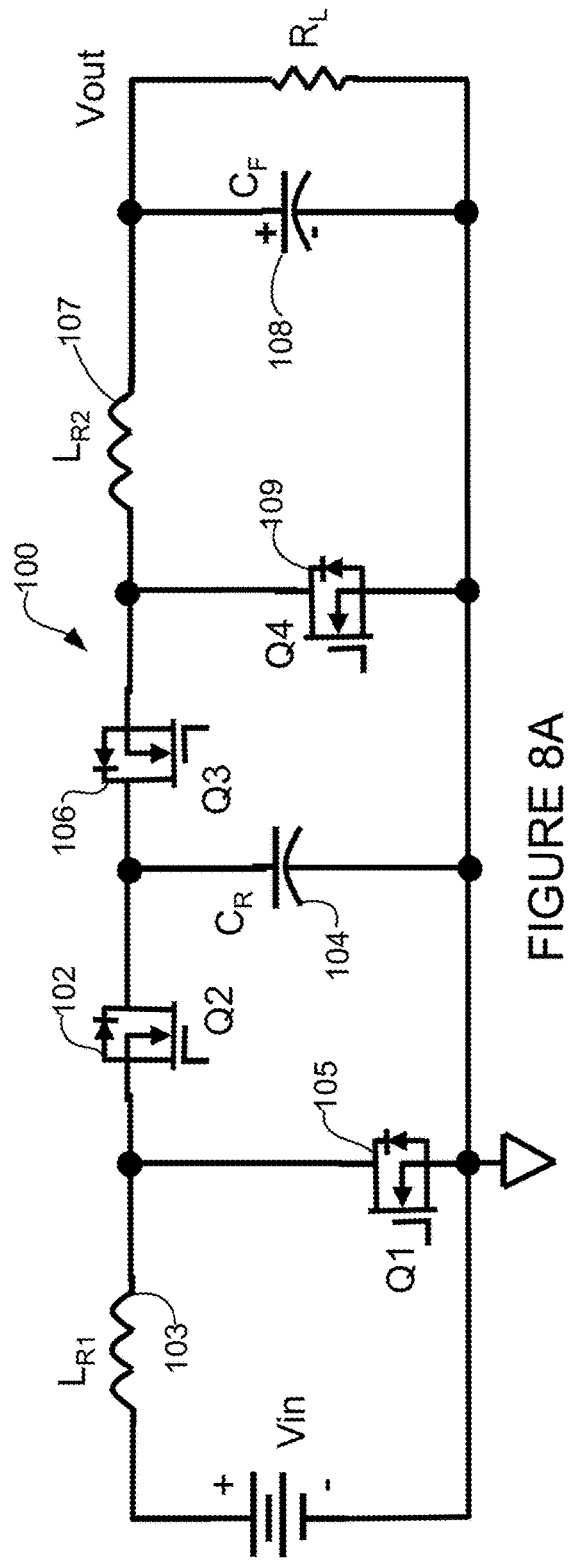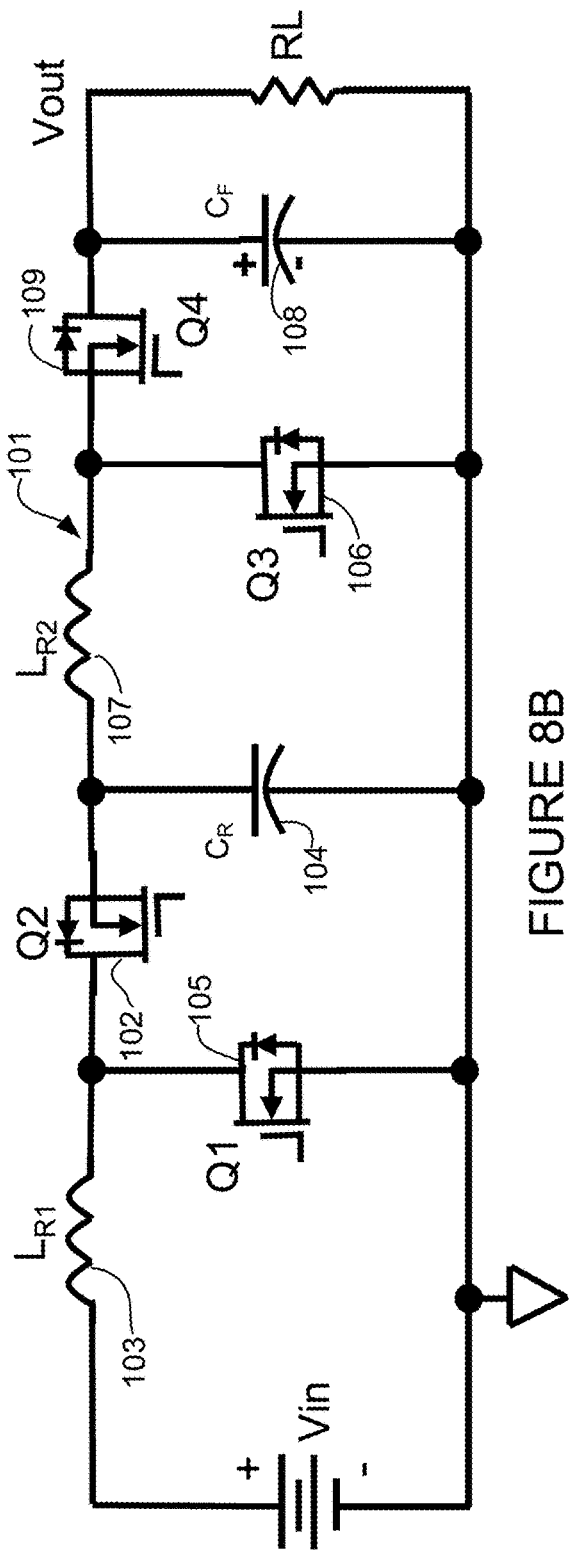
FIGURE 8A
FIGURE 8B

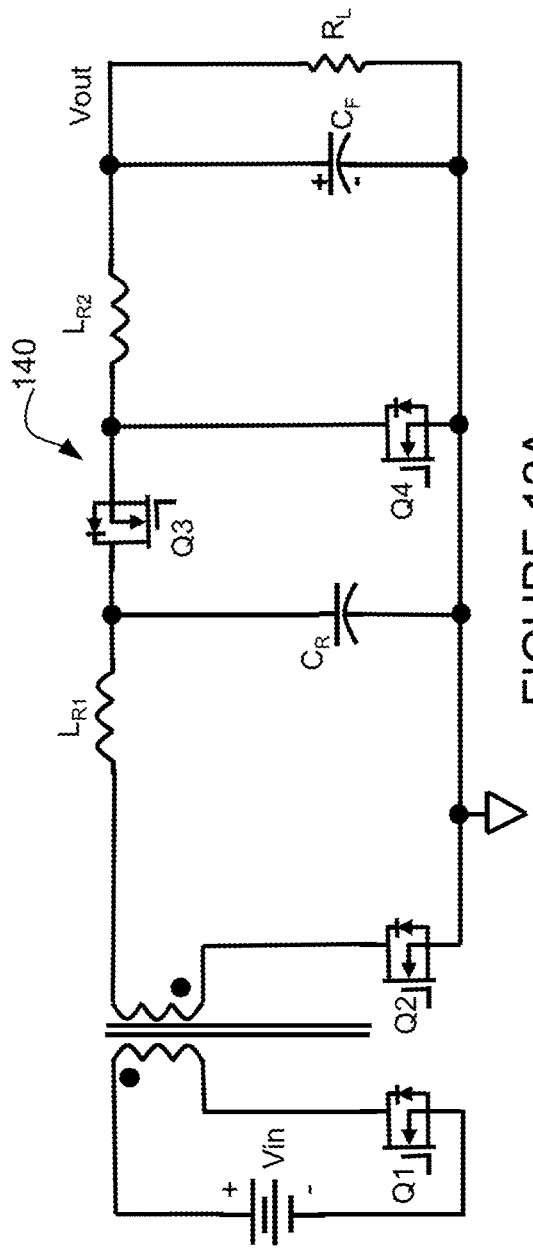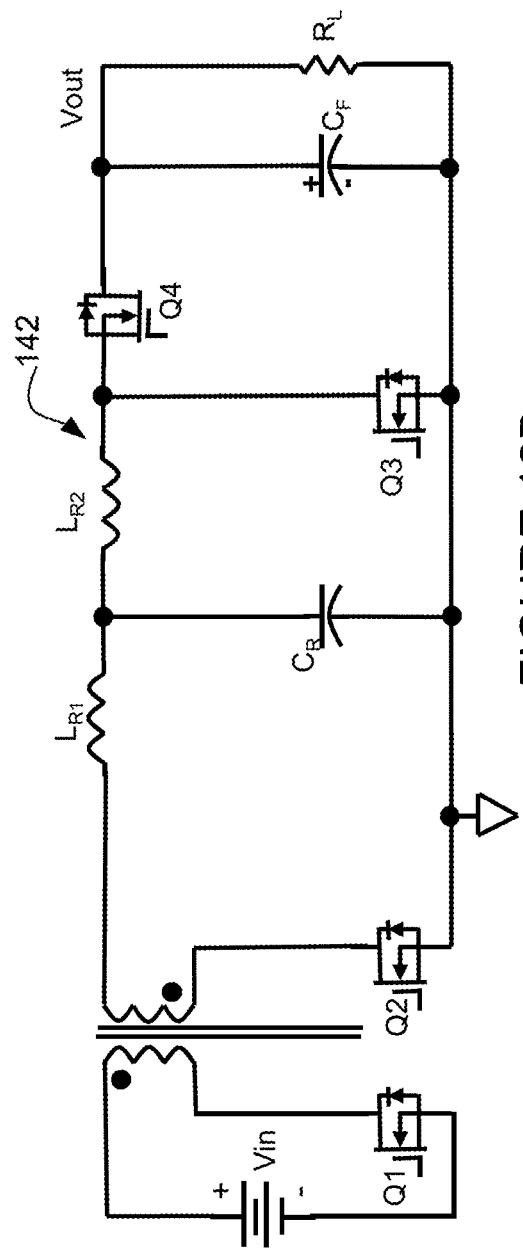
FIGURE 12A
FIGURE 12B

US 10,763,749 B2

MULTI-RESONANT CONVERTER POWER SUPPLY

TECHNICAL FIELD

The present disclosure relates generally to voltage converters, and more particularly, to multi-resonant converters.

BACKGROUND

DC-to-DC converters are used to convert a DC voltage at one level to a DC voltage at another level and deliver power to a load. Such convertors typically comprise a transformer, which provides power transfer from input to output as a voltage converter. The transformer may also provide galvanic isolation between input and output in most applications. In conventional resonant topologies, a transformer is typically needed for wide voltage conversion ranges from input to output for good efficiency. Use of a transformer, however, limits the switching frequency due to core loss at higher frequencies and has additional drawbacks such as complex circuitry, large size, and high cost.

BRIEF DESCRIPTION OF THE DRAWINGS

FIG. 8A illustrates an example of an MRC step-up-down boost-buck, in accordance with one embodiment.

FIG. 8B illustrates an example of an MRC step-up boost-boost, in accordance with one embodiment.

FIGS. 12A and 12B are examples illustrating implementation of an isolated MRC with flyback PWM of the resonant capacitor and a second resonant switched stage with a synchronous rectifier.

Corresponding reference characters indicate corresponding parts throughout the several views of the drawings.

DESCRIPTION OF EXAMPLE EMBODIMENTS

Overview

Figure 1:
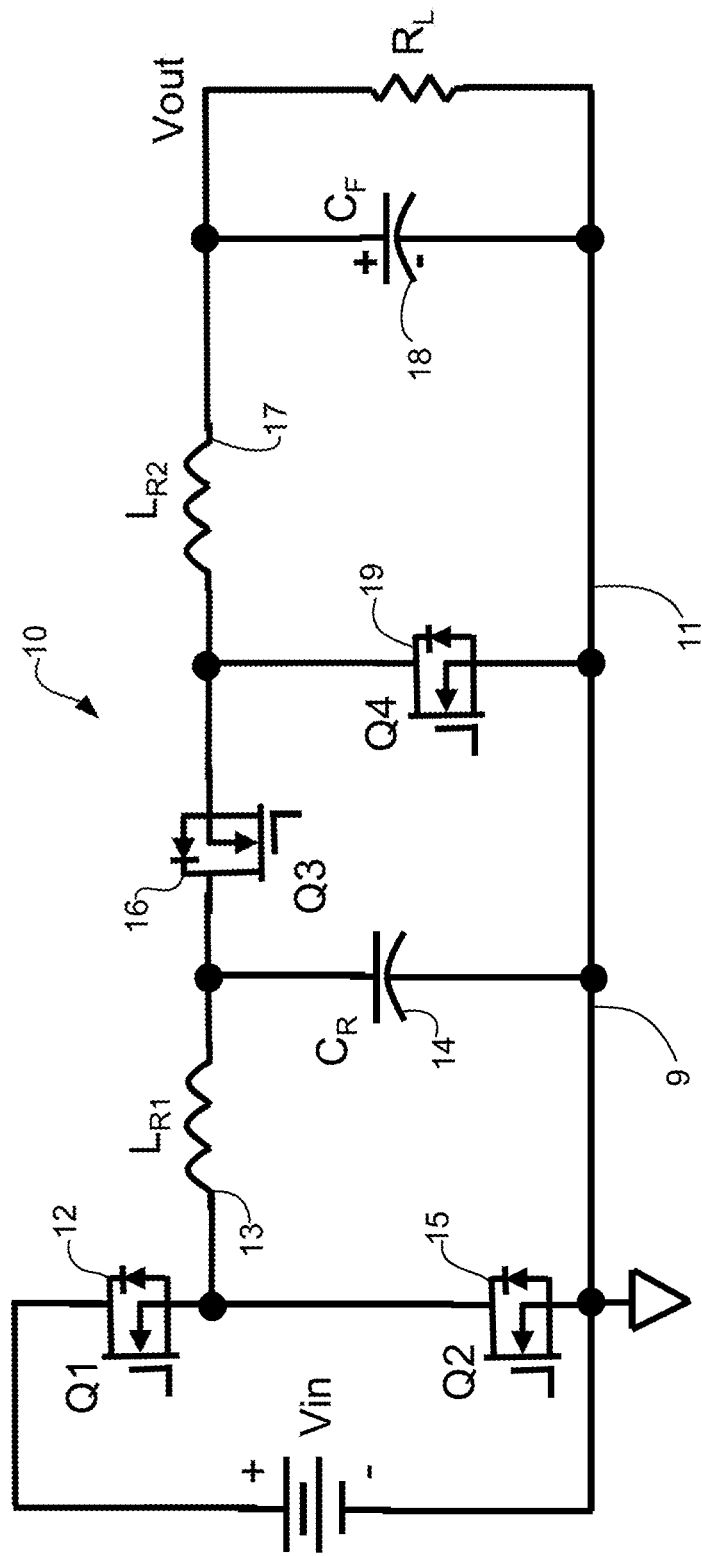
FIG. 1 illustrates an example of a step-down Multi-Resonant Converter (MRC), in accordance with one embodiment.

In one embodiment, an apparatus generally comprises a first stage comprising a first active switch, a first resonant inductor, and a resonant capacitor and a second stage comprising a second active switch, a second resonant inductor, and a filter capacitor. The first and second stages form a non-isolated multi-resonant converter topology for converting a DC input voltage to a DC output voltage.

The non-isolated multi-resonant converter may comprise a step-down converter or a step-up converter. In one or more embodiments, one or both stages comprise a synchronous rectifier. In one or more embodiments, the first and second resonant inductors operate with currents in discontinuous mode and a voltage at the resonant capacitor discharges to zero on each of a plurality of cycles. In one or more embodiments, both stages operate in discontinuous current mode with zero-current turn-on, the first stage operating at zero-current turn-off at a maximum duty cycle, and the second stage operating at zero-current turn-off at ninety degrees of a half-sine transfer pulse current. In one or more embodiments, the first stage is configured to use pulse width modulation or frequency modulation to regulate a charge stored on the resonant capacitor to regulate output voltage and current. In one or more embodiments, the second resonant inductor comprises a tapped inductor.

In another embodiment, an apparatus generally comprises a card for insertion into a network device, the card comprising a point-of-load power supply comprising a first stage comprising a first switch, a first inductor, and a resonant capacitor and a second stage comprising a second switch, a second inductor, and a filter capacitor. The first stage comprises a power regulation resonant stage and the second stage comprises a voltage converter stage to form a non-isolated multi-resonant converter.

In yet another embodiment, an apparatus generally comprises a point-of-load power supply comprising a first stage comprising a first active switch, a resonant inductor, and a resonant capacitor and a second stage comprising a second active switch, a tapped resonant inductor, and a filter capacitor. The first stage and second stage form a non-isolated multi-resonant converter for converting a DC input voltage to a DC output voltage with a step-down voltage conversion with a large input-to-output ratio example of 48 volts to 1 volt or a step-up voltage conversion with a large input-to-output ratio example of 48 volts to 400 volts.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

One or more embodiments described herein provide a two-stage, two-switch, multi-resonant voltage converter operable to provide wide-range (high voltage conversion ratio) input-to-output voltages, step-up or step-down, without a transformer for higher frequency, and high efficiency with fewer parts, smaller space requirements, and lower cost. As described in detail below, the topology combines a resonant or quasi-resonant first stage for power regulation and a second stage that acts as a voltage converter thereby enabling a wide voltage conversion range with high efficiency. In one or more embodiments, the topology may provide a DC/DC non-isolated power supply comprising a two-stage, two-switch multi-resonant converter (MRC) with quasi-resonant or full-resonant operation in one or both stages that provides voltage conversion over wide voltage ratios of up-conversion or down-conversion at high efficiency.

The embodiments described herein provide higher frequency and efficiency with fewer components for high power density. In one or more embodiments, higher efficiency is provided with soft switching resonant or quasi-resonant charging and discharging stages and higher frequency is provided without transformers typically needed for high voltage ratio conversion for step-down or step-up converters. Soft-switching in most phases provides high efficiency and lower stresses on switches and components.

As previously noted, one or more embodiments provide large voltage conversion ratios as a down-converter or up-converter without a transformer or losses in performance. Thus, a high voltage-ratio step-down or step-up converter may be implemented using the embodiments described herein without the need for a transformer. By eliminating the need for a transformer for wide voltage conversion, very high frequencies may be used with smaller size packages and higher efficiency. In one or more embodiments, the converter provides flexible voltage or current regulation including pulse width modulation (PWM), frequency modulation (FM), or both pulse width modulation and frequency modulation.

Referring now to the drawings, and first to FIG. 1, an example of a multi-resonant converter (MRC) power supply circuit, generally indicated at 10, is shown in accordance with one embodiment. In the example shown in FIG. 1, the MRC 10 is a two-stage, two-switch resonant-buck-buck converter. A first stage 9 comprises a first active switch 12 (Q1), a first resonating inductor 13 ($L_{R1}$), a resonant capacitor 14 ($C_R$), and a first synchronous rectifier 15 (Q2). A second stage 11 comprises a second active switch 16 (Q3), a second resonating inductor 17 ($L_{R2}$), a filter capacitor 18 ($C_F$), and a second synchronous rectifier 19 (Q4). A DC input voltage $V_{in}$ (DC voltage source) is converted to a DC output voltage to be imposed across a load represented by resistor $R_L$. The first inductor $L_{R1}$ is electrically coupled in series with the first switch Q1 and the resonant capacitor $C_R$. The second inductor $L_{R2}$ is electrically coupled in series with the second switch Q3 and the filter capacitor $C_F$. The synchronous rectifiers Q2 and Q4 are in parallel with the capacitors $C_R$ and $C_F$. The resistor $R_L$ is connected in parallel with the capacitor $C_F$ to form a load. As described in detail below, resonant power transfer is provided between an input LC charge storage stage (first stage 9) to output voltage conversion stage (second stage 11) to output capacitor $C_F$ and load $R_L$. The first and second stages form a non-isolated multi-resonant converter for converting a DC input voltage to a DC output voltage.

The switches Q1 and Q3 and synchronous rectifiers Q2 and Q4 may comprise any suitable actively controlled switching device (active switch) capable of operating at the desired switching frequency, such as a Metal Oxide semiconductor Field Effect Transistor (MOSFET), a Bipolar Junction Transistor (BJT), a Gallium Nitride Field Effect Transistor (GaNFET), or a solid state relay (SSR). Closing and opening of the switches may be managed by control logic coupled to the switch (not shown). The control logic may be part of a processor or a separate integrated circuit such as a pulse width modulation (PWM) controller. The voltage step-down for the MRC topology shown in FIG. 1 may be, for example, 50 volts to 25 volts (50:25V) or other suitable ratio.

The MRC 10 generally stores an energy voltage charge from the input voltage $V_{in}$ to $C_R$ and transfers that energy charge to the output filter and load with a power transfer function at $P_{in} = \frac{1}{2} C_R V_{CR}^2 F$, where Pin is the input power, $V_{CR}$ is a capacitance peak voltage charge, $C_R$ is the resonant capacitance, and F is a switching frequency. The first LC resonant stage switch Q1 charges the resonant capacitor $C_R$ with a stored power pulse from the input voltage $V_{in}$ in a first half-sine period of the switching frequency, as described below with respect to FIG. 2. The second LC resonant stage switch Q3 then transfers the stored power in the resonant capacitor $C_R$ as a voltage converter in the output filter capacitor $C_F$ and load $R_L$ at high frequency. The resonant inductor current typically operates at a discontinuous mode and the resonant capacitor voltage discharges to zero minimum voltage on each cycle with discontinuous current operation (see $V_{CR}$ trace in FIG. 2). This may require that the second stage discharge switch duty cycle be adjusted or modulated at less than 90-degrees switching cycle. But there are other possible control modes where the minimum voltage on $C_R$ is above or below zero on each switching cycle and with discontinuous or continuous current operation where the second stage discharge switch duty cycle may be adjusted to more or less than 90-degrees switching cycle and the synchronous rectifier may be eliminated.

It is to be understood that the MRC power supply topology shown in FIG. 1 is only an example and that modifications may be made to the circuit without departing from the scope of the embodiments. For example, one or both of the synchronous rectifiers Q2, Q4 may be removed. Also, the inductor $L_{R2}$ may be replaced with a tapped inductor, as described below with respect to FIG. 3. The circuit may also be modified to provide step-up conversion, as described below with respect to FIGS. 8, 10A, and 10B. Typically the minimum voltage on $C_R$ is zero on each cycle with discontinuous current operation, but is some control applications this may require that the second stage discharge switch duty cycle be adjusted or modulated at less than 90-degrees switching cycle. But there are other possible control modes where the minimum voltage on $C_R$ is above or below zero on each switching cycle and with discontinuous or continuous current operation where the second stage discharge switch duty cycle may be adjusted to more or less than 90-degrees switching cycle and the synchronous rectifier may be eliminated. Also, in one or more embodiments, the circuit may include an input isolation stage and the input isolation stage may be part of the input switching stage.

Figure 2:
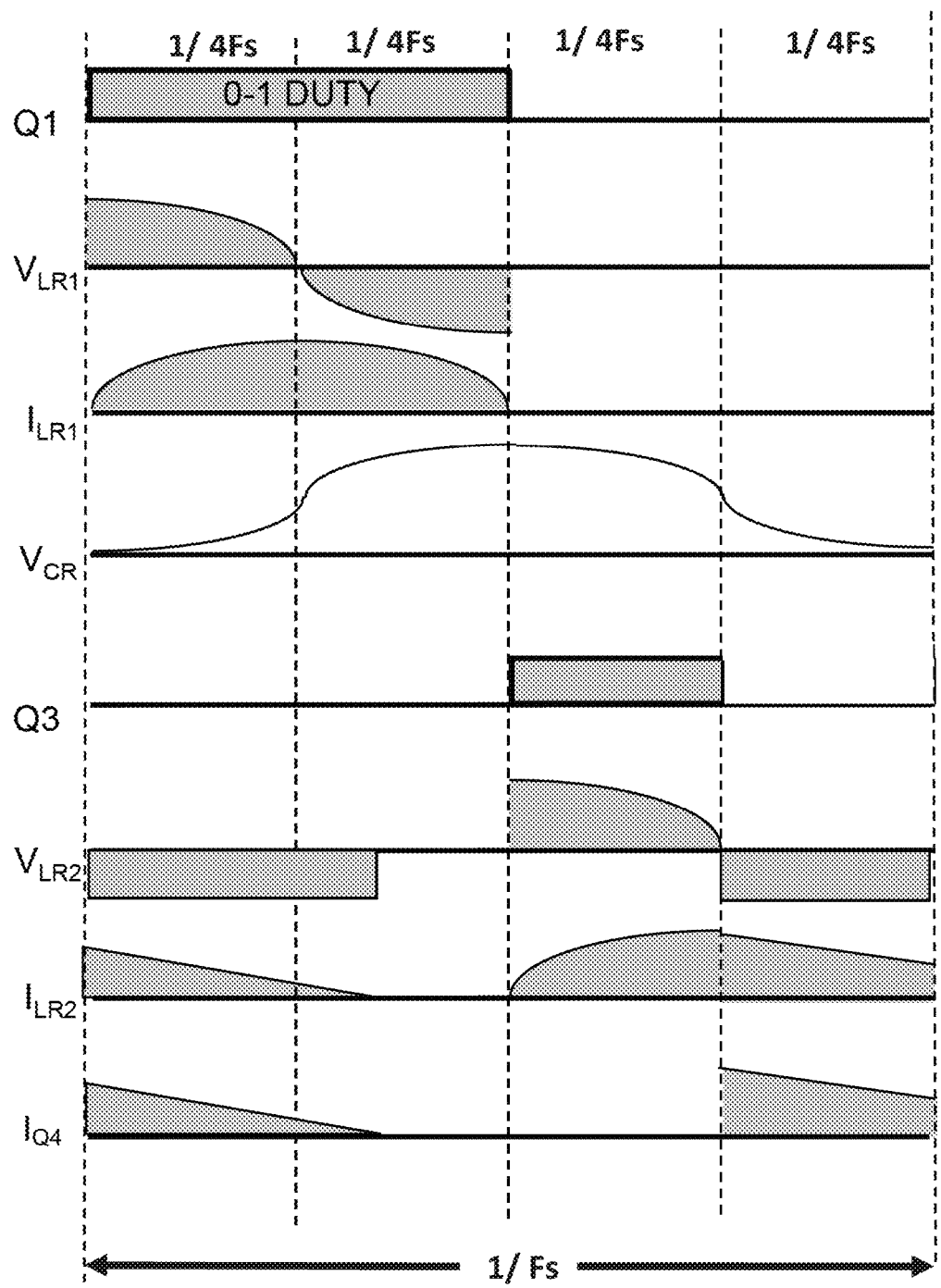
FIG. 2 illustrates operation of the MRC shown in FIG. 1.

FIG. 2 illustrates step-down MRC operation for the converter 10 shown in FIG. 1. Q1 and Q3 traces in FIG. 2 illustrate the on/off states of the switches. Q1 in FIG. 2 is the duty cycle power charge switch and Q3 is the power transfer switch. Q2 and Q4 are synchronous rectifiers with Q2 a synchronous rectifier only for Q1 $Duty_{(0-0.5)}$ modulation. The voltage and current at $L_{R1}$ are shown at $V_{LR1}$ and $I_{LR1}$, respectively. The voltage and current at $L_{R2}$ are shown at $V_{LR2}$ and $I_{LR2}$, respectively. $V_{CR}$ illustrates the charge and discharge at $C_R$. The resonant capacitor $C_R$ will charge to two times $V_{in}$ at full-duty cycle. The input switch Q1 is modulated as 0-50%/cycle (duty cycle) of resonant input charge cycle with zero-current on-switching to modulate $C_R$ with 0-2 times input voltage through $L_{R1}$ current ($I_{LR1}$).

In this example, the first LC resonant switched stage 9 operates in a discontinuous current mode with zero-current turn-on and zero-current turn-off at the maximum duty cycle of 50% of the switching frequency as a resonant half-cycle (FIGS. 1 and 2). The first LC switch resonant stage 9 may use pulse-width-modulation (PWM) over the 0-50% duty cycle to regulate the voltage charge stored on the resonant capacitor $C_R$ to regulate the output voltage and current. During PWM switching, less than the 50% of the maximum duty cycle will turn-off with interrupting current with use of a synchronous rectifier for the first resonant inductor. Another method for regulating the output voltage and current uses frequency-modulation (FM) below the resonant switching maximum frequency. A combination of both PWM and FM may also be used.

In this example, the second CL resonant switched stage 11 operates in a discontinuous current mode with zero-current turn-on, but turn-off at 90-degrees of the half-sine transfer pulse current where the synchronous rectifier clamps the current back to the output filter capacitor $C_F$ and load $R_L$. The first ½-cycle of energy storage and the second ½-cycle of energy transfer and voltage conversion complete one power cycle at the switching frequency. The output switch Q3 is fixed for 25%/cycle resonant output discharge ½-cycle with zero-current on-switching and transfers energy in $L_{R2}$ charging current into filter capacitor (output capacitor) $C_F$ and load $R_L$. This allows all of the energy storage in $C_R$ to be transferred to the output and to leave the voltage on $C_R$ at zero volts for the next charge cycle. The output inductor $L_{R2}$ may have, for example, a 25%/cycle linear output discharge of $L_{R2}$ current ($I_{LR2}$) charging into the output capacitor $C_F$ and load $R_L$.

The following are examples of MRC power transfer functions for the circuit shown in FIG. 1 and operation shown in FIG. 2:

$$Pin = \frac{1}{2} * C_R * V_{CR}^2 * F_s$$

Wherein:
$C_R$=resonant capacitor;
$V_{CR}$=capacitor peak charge voltage; and
$F_s$=switching frequency.

In one example input power is defined as follows:

$$Pin = Vin^2 * .637\ avg * Eff * D/Rin$$
$$= Vin^2 * .637\ avg * Eff * D/Z_0$$

Wherein:
$$Z_0 = (L_R/C_R)^{\wedge.5};$$
$L_R$ = resonant inductor;
$C_R$ = resonant capacitor; and
$D$ = Duty Cycle $$\text{Resonant half-cycle} = 1/(2*F) = 1/\left(\pi*(L_R/C_R)^{\wedge.5}\right)$$

The first stage 9 provides energy storage in the resonant capacitor $C_R$ in a first half-cycle of the switching period. This energy represents the power input for each cycle and may be modulated by PWM or FM, as previously noted, for output voltage and current regulation. The second stage 11 provides energy transfer from the resonant capacitor $C_R$ to the output filter capacitor $C_F$ and the load resistance $R_L$. The second stage 11 is also the voltage conversion stage as a voltage down-converter (or up-converter as described below) and controlled by the output resistance. Output power may be defined as follows:

$$Pout=Pin*Eff$$

$$Vout=(Pout*R_L)^{\wedge.5}$$

$$V_{CR}=2*Vin*\sin(Duty_{(0-1)}*90°)$$

Wherein:

$$Duty_{(0-1)}=T_{Q1\_ON}/0.5T_{Fs\_period}$$

$$C_R=Pout*\max Duty_{(0-0.5)}*Eff/(0.5*V_{CR}^2*Fs)$$

$$L_R=(t_R/\pi)^2/C_R$$

Wherein $t_R$=resonant half-sine at ½ Fs $$C_F=i*1/Fs/dv$$

Wherein i=Iout; Fs=switching frequency; and
dv=Vp-p ripple

Figure 3:
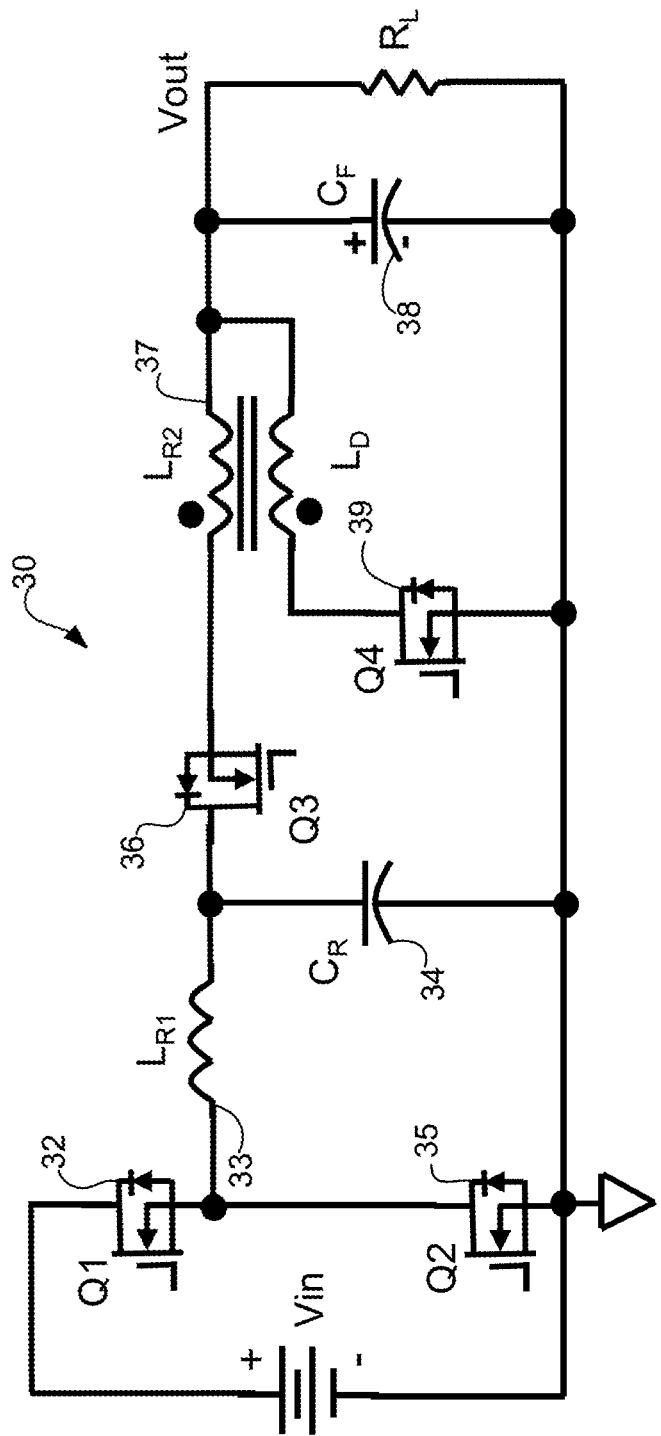
FIG. 3 illustrates an example of a high voltage-ratio step-down MRC, in accordance with one embodiment.

FIG. 3 illustrates a DC/DC resonant-buck-buck high voltage-ratio step-down MRC non-isolated power supply converter, generally indicated at 30. In this example, the second stage inductor $L_{R2}$ is replaced with a tapped inductor $L_{R2}/L_D$. $L_{R2}$ is the resonant choke for the power transfer voltage converter stage to the output filter capacitor and the load resistor. $L_D$ is the tapped inductor winding of resonant choke $L_{R2}$ for the current reset cycle with Q4 synchronous rectifier that resets linearly at the lower output voltage. The split inductor provides a high voltage-ratio where the $L_D$ inductance is much smaller than $L_{R2}$ inductance to allow less time for the $L_{R2}$ current reset cycle with the very low output voltage on $L_D$ compared to the higher voltage that was across $L_{R2}$ during the Q3 discharge ¼-cycle. In one example, the DC/DC step-down MRC 30 shown in FIG. 3 provides a 48 volts to 1 volt ratio (48:1V), 50:5V, or any other suitable step-down POL converter high voltage-ratio with high efficiency.

Figure 4:
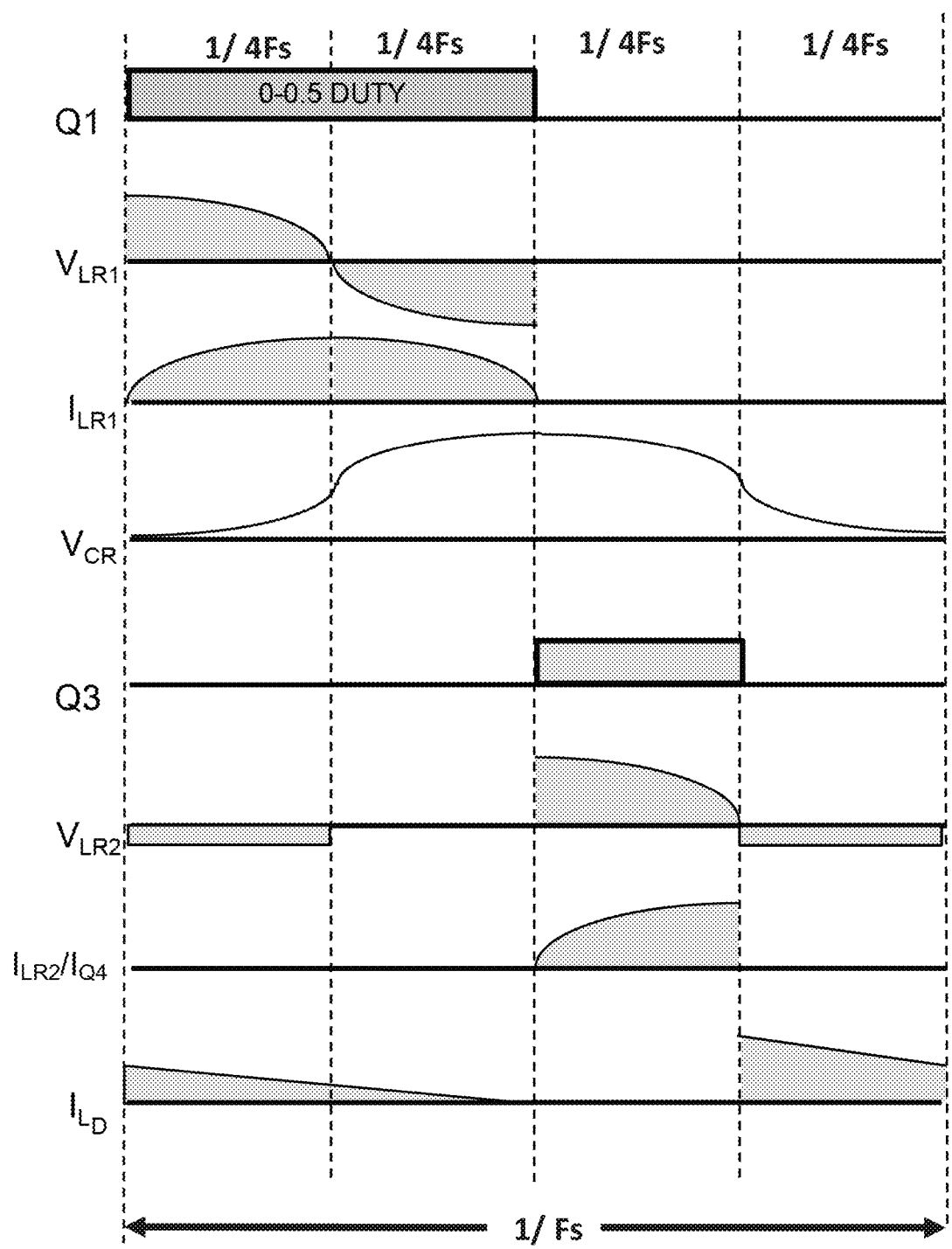
FIG. 4 illustrates operation of the MRC shown in FIG. 3.

FIG. 4 illustrates step-down MRC operation for the converter 10 shown in FIG. 3. Q1 and Q3 traces in FIG. 4 illustrate the on/off states of the switches. Q1 in FIG. 2 is the duty cycle power charge and Q3 is the power transfer. Q2 and Q4 are synchronous rectifiers with Q2 a synchronous rectifier only for Q1 $Duty_{(0-0.5)}$ modulation. The voltage and current are shown for $L_{R1}$ at $V_{LR1}$ and $I_{LR1}$, respectively. Current is shown for $L_{R2}$ relative to synchronous rectifier Q4 at $I_{Lr2}$ and for $L_D$ at $I_{LD}$. $V_{CR}$ illustrates the charge and discharge at $C_R$.

Power and voltage may be calculated as previously described with respect to FIG. 1. $L_D$ may be defined as follows:

$$L_D=e*1.5t_R*0.5/di$$

Wherein:
e=Vout;
di=Iout/($Duty_{(0-0.25)}*0.5$ for average)

Figure 5:
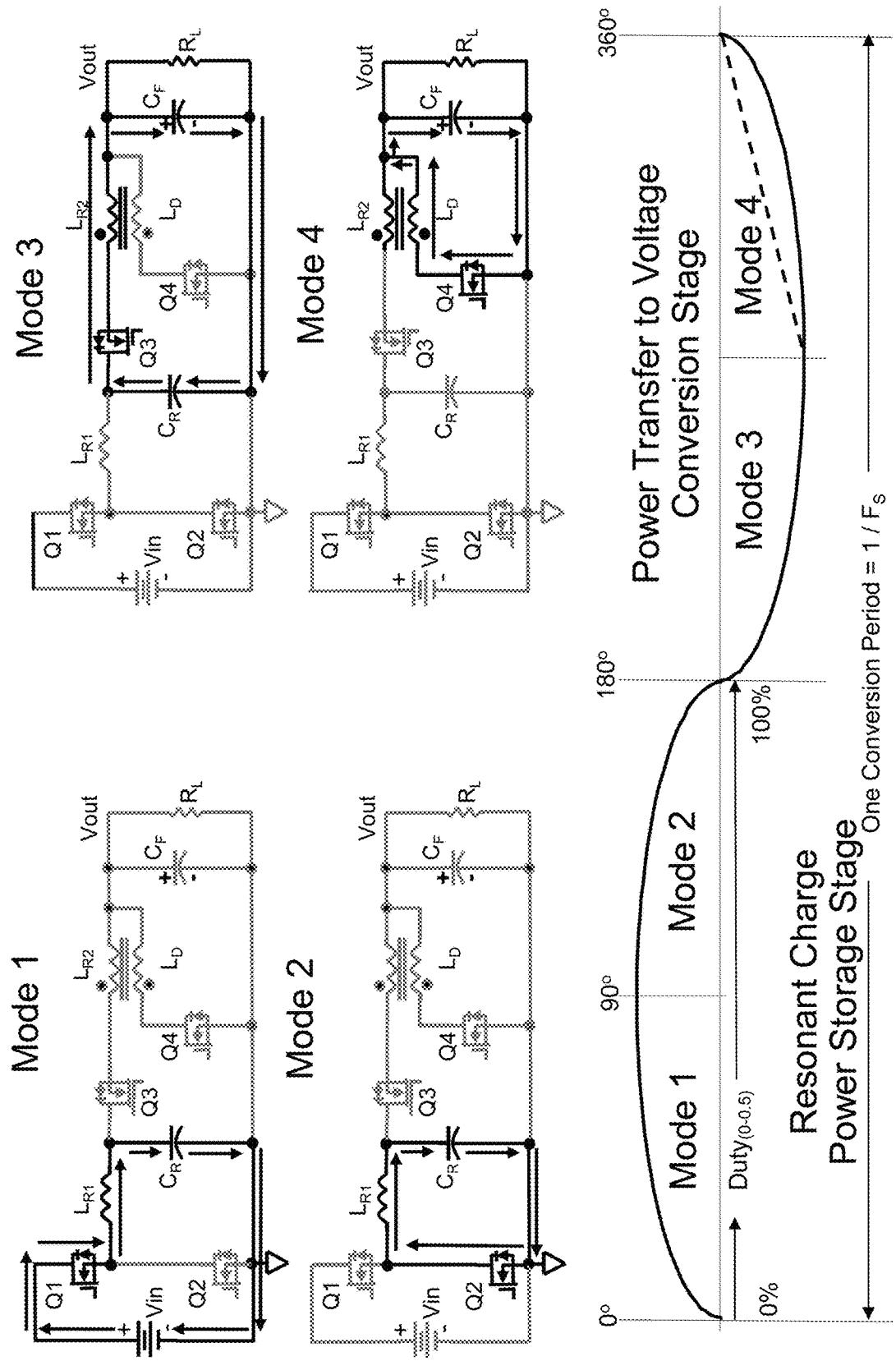
FIG. 5 illustrates additional detail of operation of the MRC shown in FIG. 3 in a power storage stage and power transfer stage.

FIG. 5 illustrates power storage and voltage conversion stages in the MRC power supply topology shown in FIG. 3 with a duty cycle of 0-100% in a first ½ cycle. Mode 1 and Mode 2 make up the resonant charge power storage stage. Mode 1 illustrates the power storage duty cycle maximum period with $V_{in}$ into $L_{R1}/C_R$ through Q1 for charge $I_{LR1}$. Mode 2 covers the power storage maximum period for discharge $L_{LR1}$ to $C_R$ after duty cycle with synchronous rectifier Q2. Mode 3 and Mode 4 make up the power transfer to voltage conversion stage. Mode 3 illustrates the resonant discharge of $C_R$ into $L_{R2}/C_F$ through Q3 for charge $I_{LR2}$.

Mode 4 shows a linear discharge of $L_{R2}/L_D$ for discharge $I_{LR2}$ with synchronous rectifier Q4.

Figure 6:
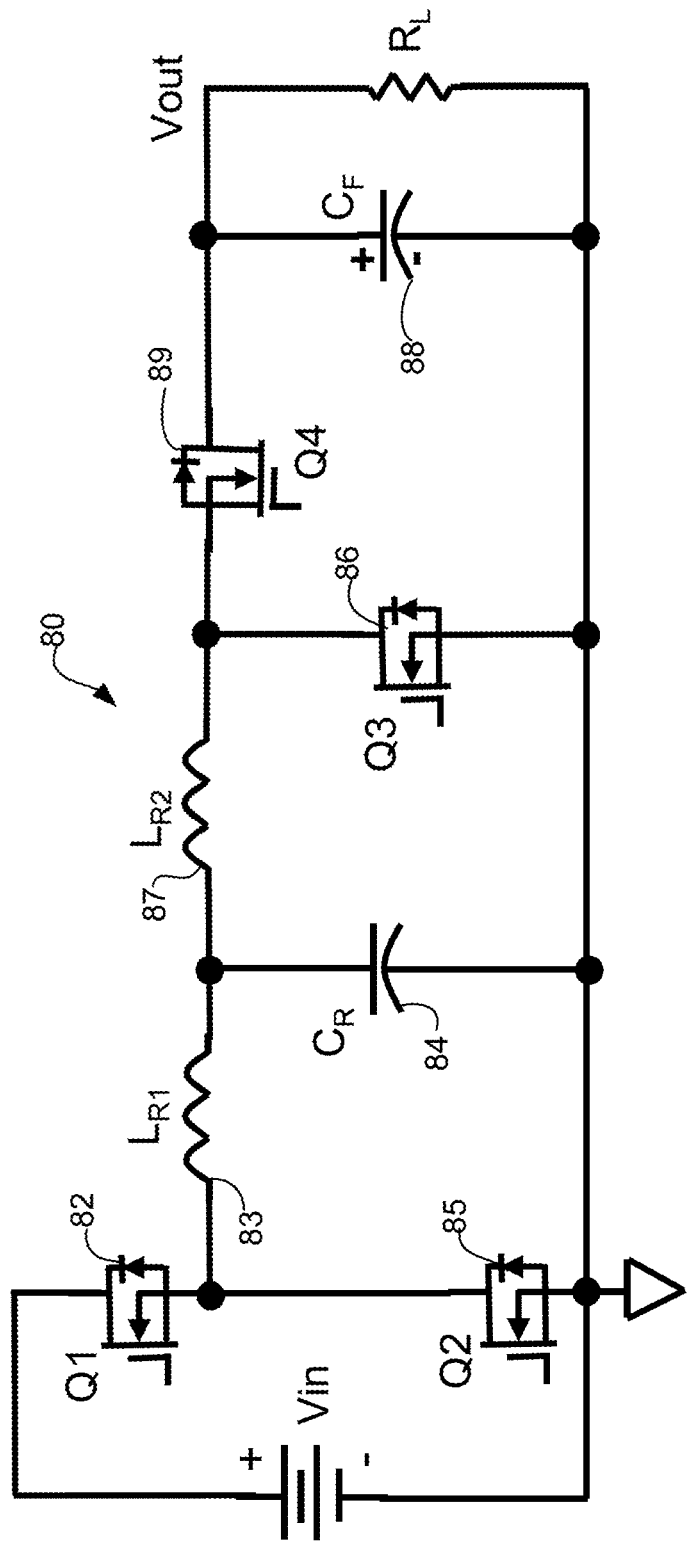
FIG. 6 illustrates an example of an MRC step-down-up buck-boost, in accordance with one embodiment.

As previously noted, the MRC may also comprise a step-up converter. FIG. 6 illustrates an example of a DC/DC MRC two-switch, two-stage resonant-buck-boost step-down-up power supply that can be used as a voltage step-up or step-down converter, generally indicated at 80. This topology allows simple high efficiency step-up voltage conversion with high voltage input-to-output ratios such as 48:400V, 50:400V, or other suitable ratio (e.g., at least 48:400V). In the example shown in FIG. 6, a first stage includes a first switch 82 (Q1), a first resonant inductor 83 ($L_{R1}$), and a resonant capacitor 84 ($C_R$). The second stage includes a second resonant inductor 87 ($L_{R2}$), second switch 86 (Q3) and filter capacitor 88 ($C_F$). In this example, each stage also includes a synchronous rectifier 85 (Q2), 89 (Q4).

Figure 7:
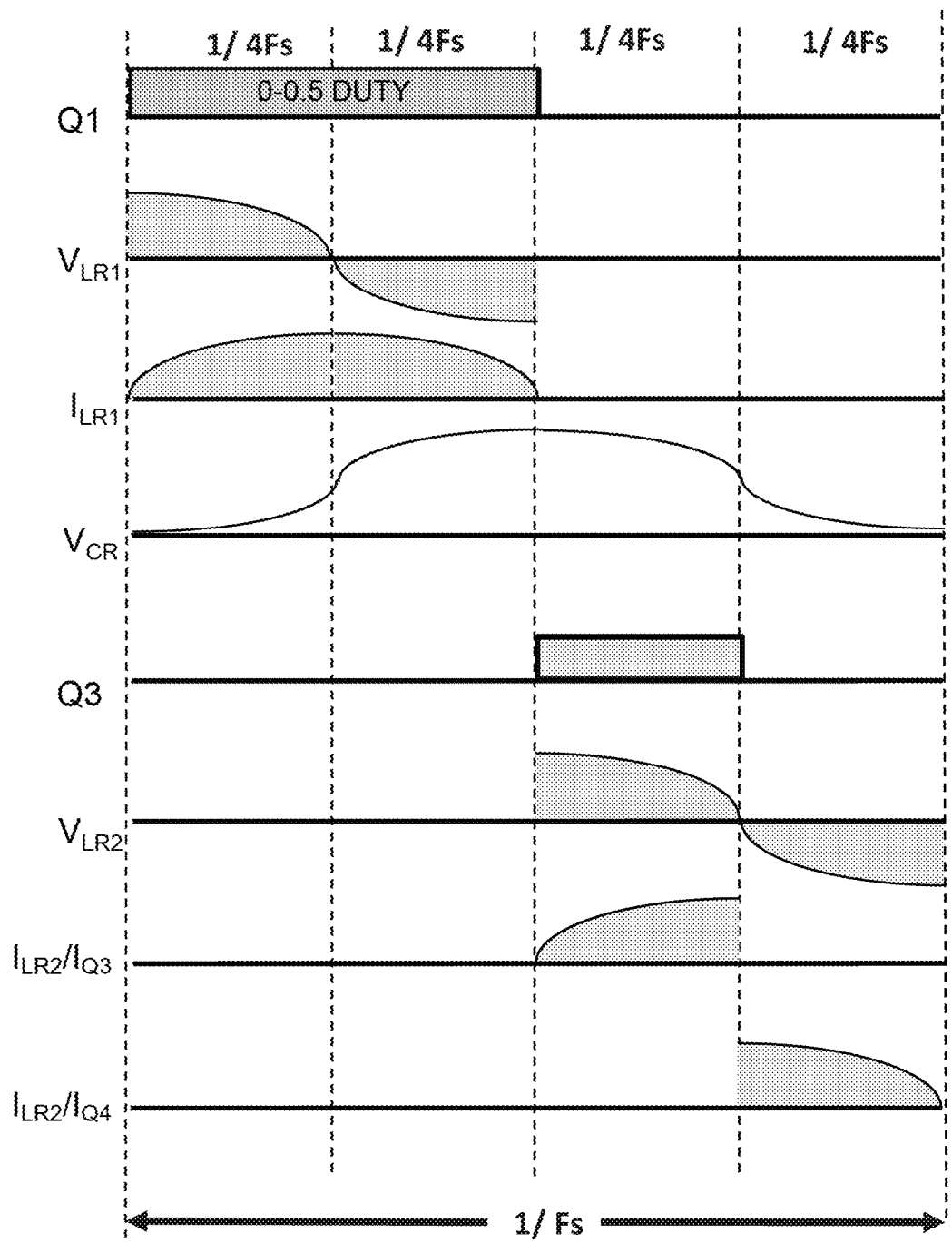
FIG. 7 illustrates operation of the MRC shown in FIG. 6.

FIG. 7 illustrates operation of the two-stage, two-switch step-up example MRC 80 shown in FIG. 6. The on/off cycles of the switches are shown at Q1 and Q3. Q1 is the duty cycle power charge and Q3 is the power transfer. Q2 and Q4 are synchronous rectifiers, with Q2 a synchronous rectifier only for Q1 duty cycle 0-50% modulation.

Voltage and current between switch Q1 and inductor $L_{R1}$ are shown at $V_{LR1}$ and $I_{LR1}$, respectively. The charge and discharge voltage of $C_R$ is shown at $V_{CR}$. Voltage at $L_{R2}$ is shown at $V_{LR2}$. Current between $L_{R2}$ and Q3 is shown at $I_{LR2}/I_{Q3}$ and current between $I_{LR2}$ and Q4 is shown at $I_{LR2}/I_{Q4}$.

The following are example power transfer function descriptions for the circuit shown in FIG. 6 and corresponding operation shown in FIG. 7.

$$Vout(Pout*R_L)^{-0.5}$$

$$Pout=Pin*Eff=0.5*C_R*V_{CR}^2*Fs*Eff$$

$$V_{CR}=2*Vin*\sin(Duty_{(0-1)}*90°)$$

Wherein:
$Duty_{(0-1)}=T_{Q1\_ON}/0.5T_{Fs\_period}$ $$C_R=Pout*Duty*Eff/(0.5*V_{CR}^2*Fs)$$

$$L_{R1}=(tR/pi)2/C_R$$

Wherein:
tR=resonant half-sine at ½ Fs $$L_{R2}=e*(1.5tR*0.5)/di$$

Wherein:
e=Vout; and
di=Iout/(Duty*0.5 for average)

$$C_F=i*1/Fs/dv$$

Wherein:
i=Iout;
Fs=switching frequency; and
dv=Vp-p ripple

Another example of a DC/DC resonant-boost-buck step-up-down MRC non-isolated (unisolated) voltage converter with two switches and two synchronous rectifiers is shown in FIG. 8A and generally indicated at 100 that can be used as a voltage step-up or a step-down converter. The circuit 100 includes resonant inductors 103 ($L_{R1}$), 107 ($L_{R2}$), resonant capacitor 104 ($C_R$), filter capacitor 108 ($C_F$), switches 105 (Q1) and 106 (Q3), and synchronous rectifiers 102 (Q2), and 109 (Q4). The MRC 100 is configured to provide higher storage charge voltage. An example of an MRC step-up boost-boost, generally indicated at 101 is shown in FIG. 8B.

As shown in FIG. 8B, the components in the second stage have been modified to change from a buck to a boost.

Figure 9:
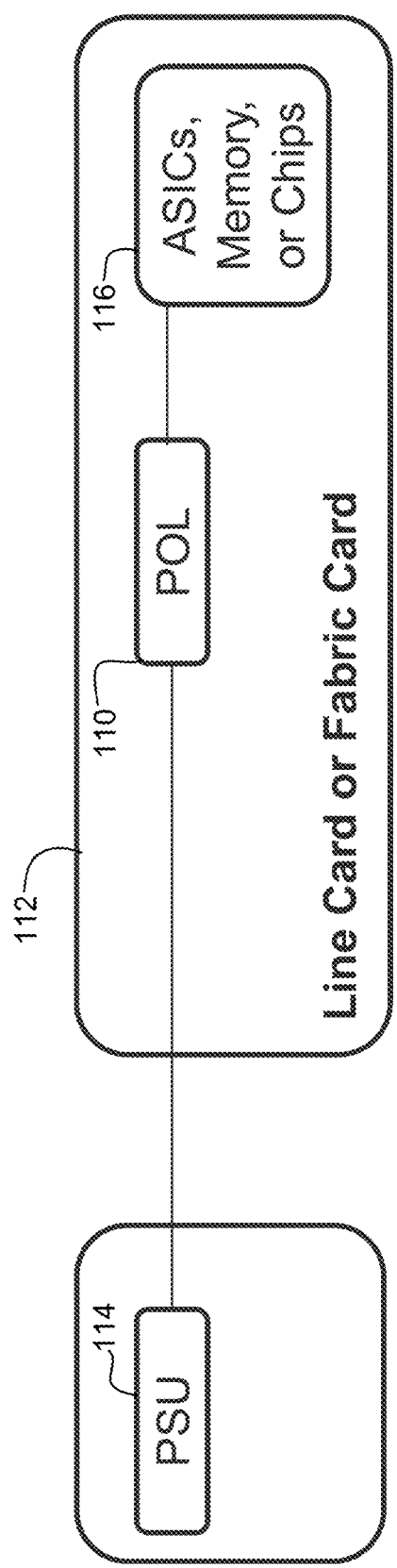
FIG. 9 is a block diagram illustrating implementation of the MRC as a point-of-load power supply on a line card or fabric card, in accordance with one embodiment.

In one or more embodiments, a POL converter 110 in accordance with one of the embodiments described herein may be used to replace a conventional IBC (Intermediate-Bus-Converter) and POL converter on a line card or fabric card 112, as shown in FIG. 9. In one example, the POL converter 110 may be used to replace a standard 48:12/10V IBC plus a 12/10V:1V POL converter with a 48:1V POL, while providing high efficiency, small size, low cost package and eliminating a transformer for size and frequency limits. In the example shown in FIG. 9, the POL 110 receives power from a PSU (Power Supply Unit) 114 and provides power to one or more processor (e.g., ASIC (Application Specific Integrated Circuit)), memory, or other chips or devices 116.

It is to be understood that the implementation shown in FIG. 9 is only an example, the POL may be used on any type of board or system type and power supply application, including for example, LED, Laser, battery charger, motor, fan, etc.

The embodiments described herein may be implemented, for example, in Board Mounted Power (BMP) POL power supplies, BMP IBC power supplies, Front End Power (FEP) Power Factor Converter (PFC) power sections, LLC-type resonant power converters, high voltage multipliers, buck, boost, forward, multi-phase stages, or any other suitable applications.

Figure 10:
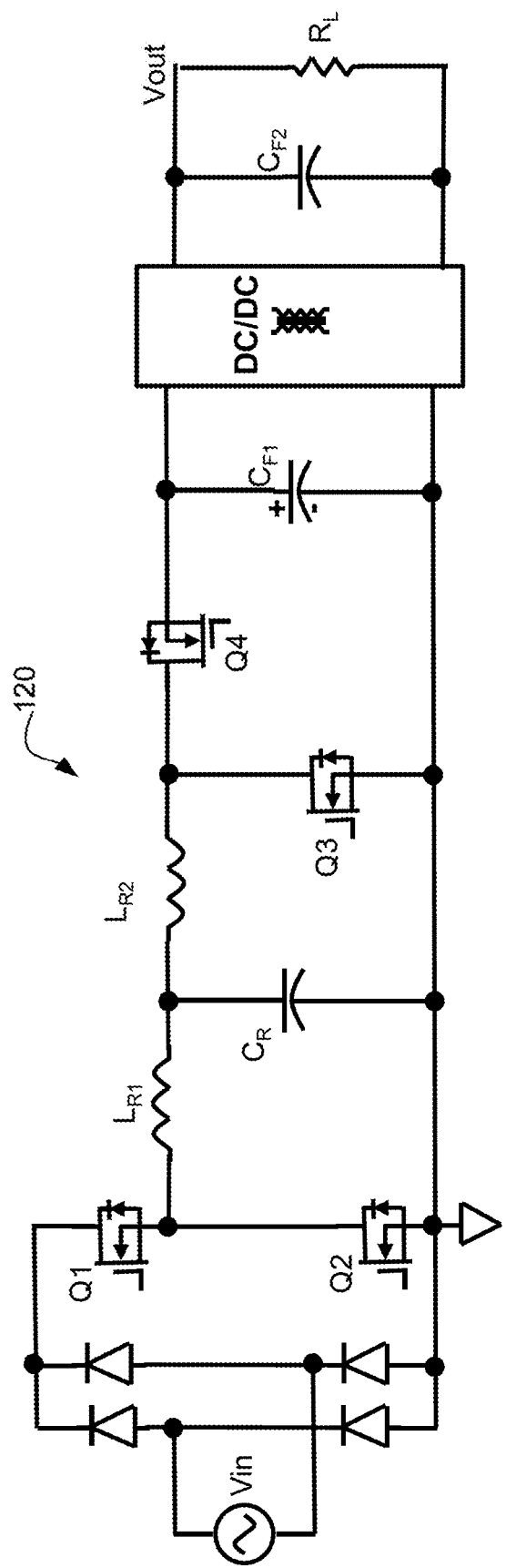
FIG. 10 is an example illustrating implementation of the MRC topology of FIG. 6 in an AC/DC PFC (Power Factor Correction) MRC stage to isolated DC/DC converter.

In one example shown in FIG. 10, the MRC topology of FIG. 6 may be incorporated for use in an AC/DC non-isolated PFC (Power Factor Correction) MRC stage to an isolated DC/DC converter, generally indicated at 120. The circuit may comprise, for example, an AC input rectifier to MRC two-stage buck-boost two-switch two-synchronous rectifier example as a step-up converter stage to an isolation DC/DC converter stage. In the example shown in FIG. 10, the circuit includes a PFC stage with a large $C_{F1}$ capacitance provides bulk voltage energy storage for line drop-out time protection with output power ride-through time. Also the PFC MRC provides no inrush surge current so no soft-start circuit is needed. Any bulk voltage may be used and switch Q1 and the input bridge rectifier may be replaced with a bridgeless PFC rectifier and first stage switching circuit. The $C_R$ peak voltage may charge to 2 times the maximum peak input line voltage and needs to be lower than the minimum bulk voltage on CF1 to provide good PFC through the input AC waveform. The minimum voltage on $C_R$ needs to be at zero on each switching cycle to provide best PFC though each sine wave half cycle so the $L_{R1}$ charge current can follow the rectified input line proportional to the duty cycle of Q1. This may require the second stage Q3 switch to adjust or modulate the duty cycle to less than 90-degrees switching cycle throughout the line rectified sine wave. PFC power supplies may use MRC buck-boost, boost-buck, or boost-boost converters for different applications.

Figure 11A:
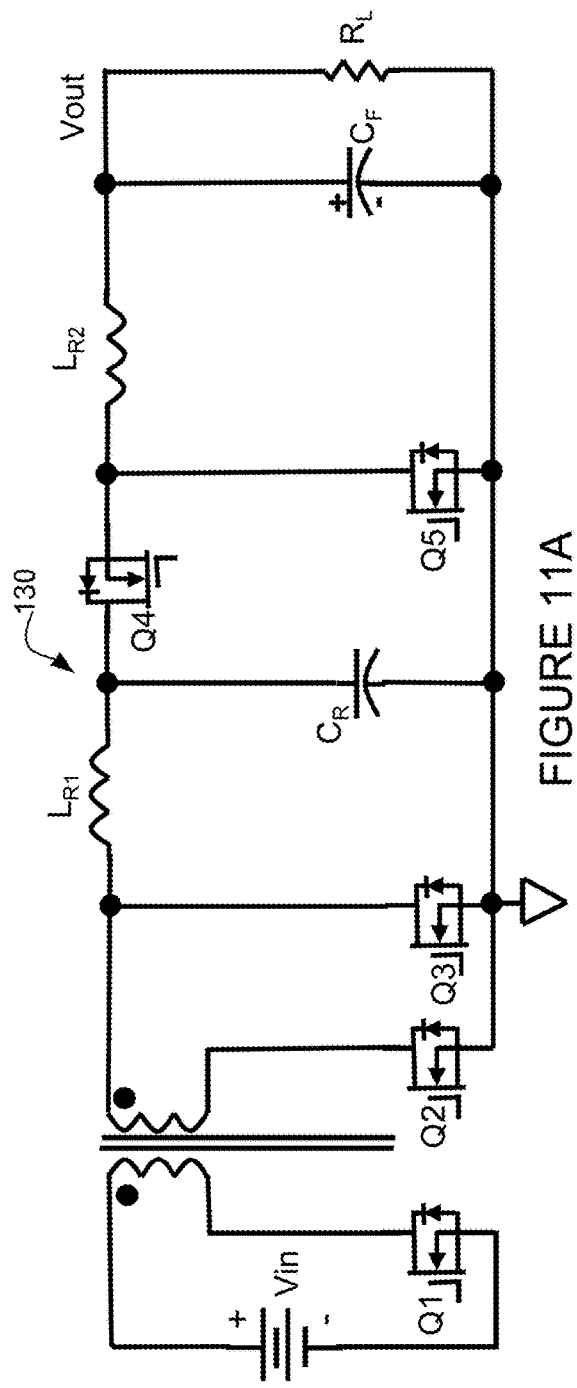
FIG. 11A is an example illustrating implementation of the step-down MRC topology of FIG. 1 in a DC/DC isolated MRC with a forward converter transformer stage.
Figure 11B:
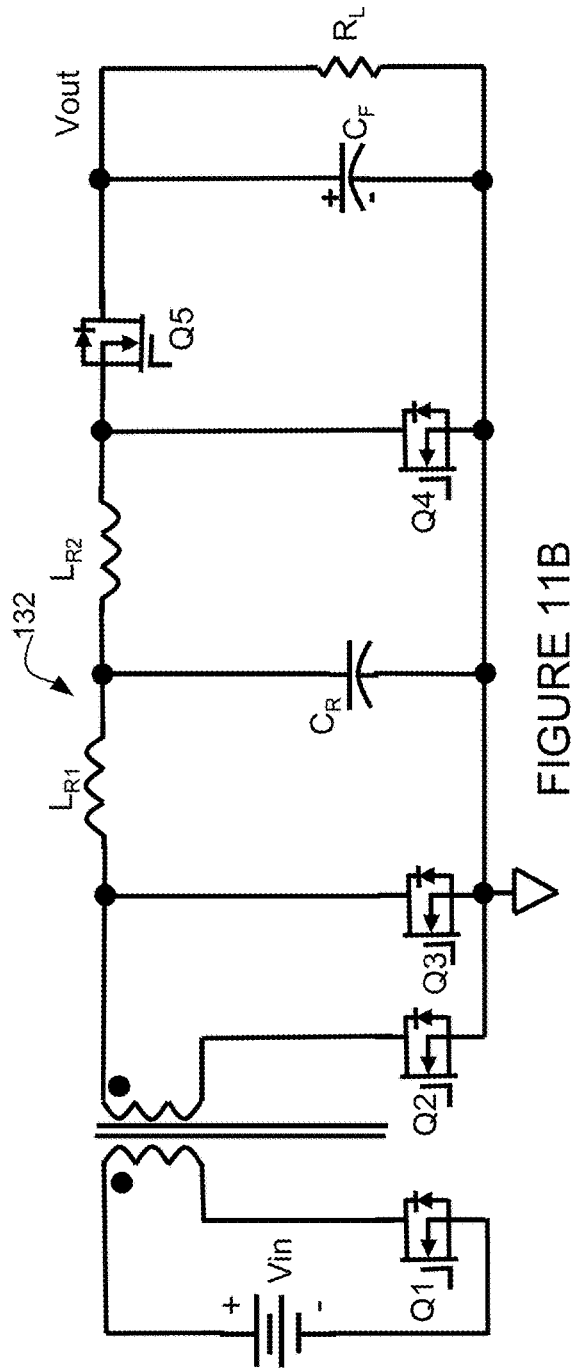
FIG. 11B is an example illustrating implementation of the step-up MRC topology of FIG. 6 in a DC/DC isolated MRC with a forward converter transformer stage.

FIGS. 11A, 11B, 12A, and 12B illustrate examples in which the MRC topologies described herein (e.g., MRC topology of FIG. 1) may be used in a DC/DC isolated MRC with a forward converter transformer stage to form a power supply circuit. In one example, a circuit 130 includes an isolated MRC buck-buck step-down-down voltage converter with two switches and three synchronous rectifiers (FIG. 11A). In another example, a circuit 132 forms an isolated MRC resonant buck-boost step-down-up voltage converter with two switches and three synchronous rectifiers (FIG. 11B). FIGS. 12A and 12B illustrate example topologies, generally indicated at 140 and 142, respectively, comprising an isolated MRC with flyback PWM control of the resonant capacitor charge and a synchronous rectifier as the first stage to a resonant-buck or a resonant-boost second stage.

It is to be understood that the circuits shown in FIGS. 10, 11A, 11B, 12A, and 12B are only examples and that the MRC topologies described herein may be incorporated in any other type of circuit or topology to create other types of circuits for implementation in other applications.

The multi-resonant converter (MRC) power supply circuits described herein may be used in any type of power supply application including a network device (e.g., server, router, switch, gateway, controller, edge device, access device, aggregation device, core node, intermediate node, or other network device). The network device may operate in the context of a data communications network including multiple network devices and may communicate over one or more networks.

The network device may be a programmable machine implemented in hardware, software, or any combination thereof. The network device may include one or more processor, memory, and network interface. Memory may be a volatile memory or non-volatile storage, which stores various applications, operating systems, modules, and data for execution and use by the processor. Logic may be encoded in one or more tangible media for execution by the processor. For example, the processor may execute codes stored in a computer-readable medium such as memory. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network interfaces may comprise one or more line cards, fabric cards, service card, router processor card, controller card, or other card, element, or component and the POL converter may be located on one or more the cards. It is to be understood that the network device described herein is only an example and that the embodiments described herein may be implemented on different configurations of network devices.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An apparatus comprising:
a first stage comprising a first active switch, a first resonant inductor, and a resonant capacitor; and
a second stage comprising a second active switch, a second resonant inductor, and a filter capacitor;
wherein said first and second stages form a non-isolated multi-resonant converter for converting a DC input voltage to a DC output voltage and the apparatus comprises an input isolation stage.

2. The apparatus of claim 1 wherein the non-isolated multi-resonant converter comprises a step-down voltage converter.

3. The apparatus of claim 1 wherein the non-isolated multi-resonant converter comprises a step-up voltage converter.

4. The apparatus of claim 1 wherein at least one of said stages comprises a synchronous rectifier.

5. The apparatus of claim 1 wherein each of said stages comprises a synchronous rectifier.

6. The apparatus of claim 1 wherein said first and second resonant inductors operate with currents in discontinuous mode and wherein a voltage at the resonant capacitor discharges to zero on each of a plurality of cycles.

7. The apparatus of claim 1 wherein said first and second resonant inductors operate with currents in continuous mode and wherein a voltage at the resonant capacitor discharges other than zero on each of a plurality of cycles.

8. The apparatus of claim 1 wherein said first stage and said second stage operate in discontinuous current mode with switch zero-current turn-on.

9. The apparatus of claim 1 wherein the apparatus is operable to use frequency modulation to regulate output voltage and current.

10. The apparatus of claim 1 wherein said first stage is configured to use pulse width modulation to regulate a charge stored on the resonant capacitor to regulate output voltage and current.

11. The apparatus of claim 1 wherein said second resonant inductor comprises a tapped inductor.

12. An apparatus comprising:
a first stage comprising a first active switch, a first resonant inductor, and a resonant capacitor; and
a second stage comprising a second active switch, a second resonant inductor, and a filter capacitor;
wherein said first and second stages form a non-isolated multi-resonant converter for converting a DC input voltage to a DC output voltage and the apparatus comprises a power factor correction stage.

13. The apparatus of claim 12 wherein the non-isolated multi-resonant converter comprises a step-down voltage converter.

14. The apparatus of claim 12 wherein the non-isolated multi-resonant converter comprises a step-up voltage converter.

15. An apparatus comprising:
a card for insertion into a network device, the card comprising a point-of-load power supply comprising:
a first stage comprising a first switch, a first inductor, and a resonant capacitor; and
a second stage comprising a second switch, a second inductor, and a filter capacitor;
wherein said first stage comprises a power regulation resonant stage and said second stage comprises a voltage converter resonant stage to form a non-isolated multi-resonant converter and the apparatus comprises an input isolation stage.

16. The apparatus of 14 wherein the point-of-load power supply eliminates a need for an intermediate bus converter on the card.

17. The apparatus of claim 15 wherein at least one of said stages comprises a synchronous rectifier.

18. The apparatus of claim 15 wherein said second inductor comprises a tapped resonant inductor.

19. The apparatus of claim 15 wherein said first stage is configured to use pulse width modulation or frequency modulation to regulate output voltage and current.

20. A point-of-load power supply comprising:
a first stage comprising a first active switch, a resonant inductor, and a resonant capacitor; and
a second stage comprising a second active switch, a tapped resonant inductor, and a filter capacitor;
wherein said first stage and said second stage form a non-isolated multi-resonant converter for converting a DC input voltage to a DC output voltage with a step-down voltage conversion or a step-up voltage conversion; and wherein the point-of-load power supply comprises a power factor correction stage.

\* \* \* \* \*